Patented Dec. 28, 1937

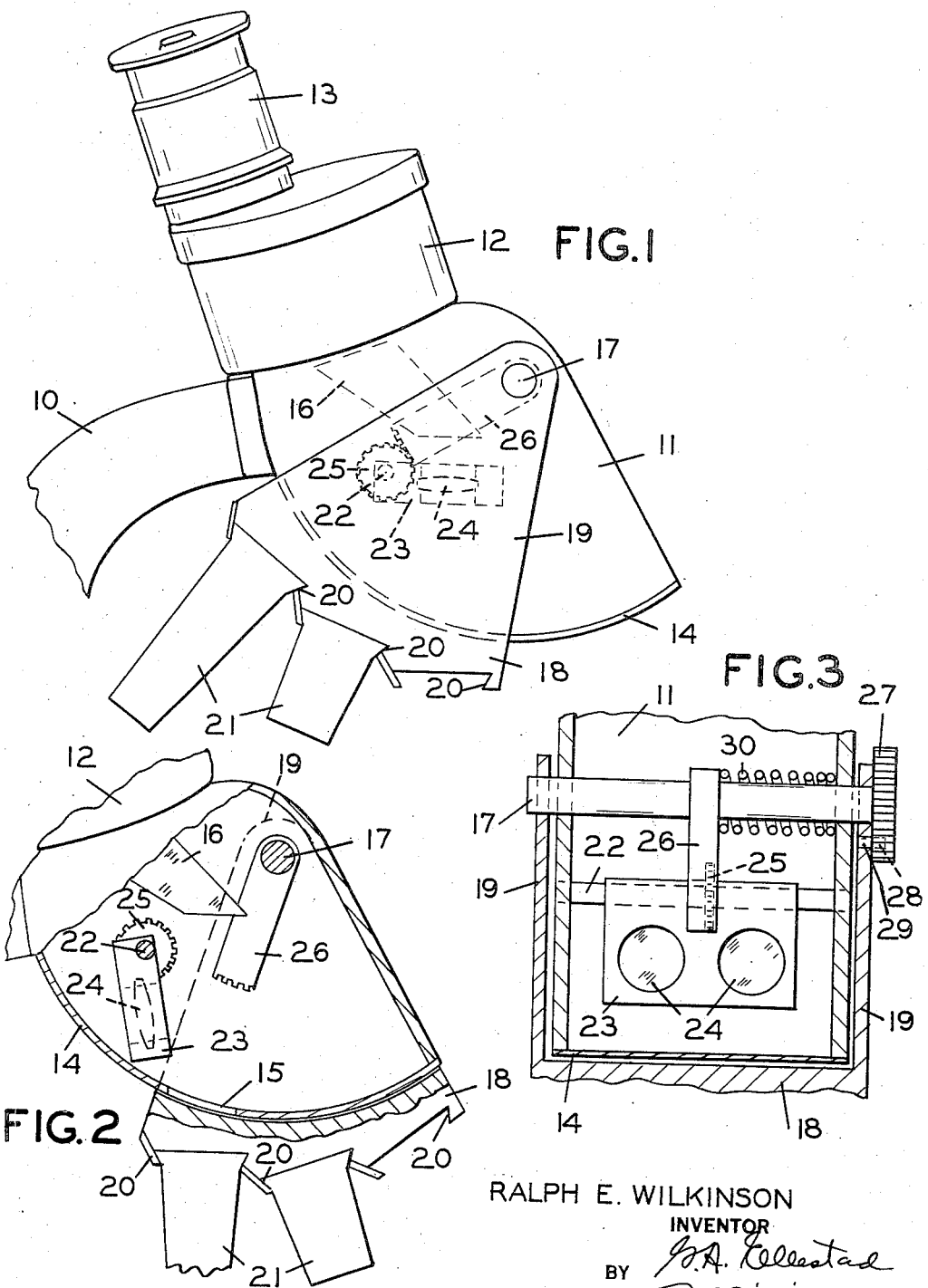

2,103,573

UNITED STATES PATENT OFFICE 2,103,573

MICROSCOPE

Ralph E. Wilkinson, Irondequoit, N. Y., assignor to Bausch & Lomb Optical Company, Rochester, N. Y., a corporation of New York Application August 20, 1935, Serial No. 37,004

8 Claims. (Cl. 88—39)

The present invention relates to microscopes and more particularly to binocular microscopes of variable power.

One of the objects of the present invention is to provide a simple, practical and efficient means for varying the power of a binocular microscope. Another object is to provide a microscope with a pivoted objective lens mount, a pivoted multiple objective carrier and means for interconnecting the mount and the carrier. A further object is to provide a simple and efficient connecting means between the objective mount and objective carrier which may be selectively disconnected at will. These and other objects and advantages reside in certain novel features of construction, arrangement and combination of parts as will hereinafter be more fully set forth and pointed out in the appended claims.

Referring to the drawing:

Fig. 1 is a side elevation of a microscope body embodying my invention.

Fig. 2 is a fragmentary view similar to Fig. 1 with parts broken away.

Fig. 3 is a fragmentary vertical section of the body member.

A preferred embodiment of my invention is illustrated in the drawing wherein 10 indicates a microscope arm on which is secured a body member 11. Mounted upon the body member 11 are two prism boxes 12 carrying oculars 13. The prism systems may be of any suitable form such as that shown in Patent 1,225,167 issued May 8, 1917, to W. L. Patterson et al.

The lower end of the body member 11 is arcuately curved and is closed by a wall 14 which is apertured at 15 to permit the passage of light to the prisms 16 and prism boxes 12. A shaft 17 is rotatably and axially slidably mounted in the body member 11 with its axis substantially coincident with the axis of curvature of the arcuate wall 14. The ends of the shaft 17 extend beyond the walls of the body member 11, and the multiple objective carrier 18 has two upstanding arms 19 which are rotatably carried by the shaft 17 outside of the body member 11. The clearance between the wall 14 and the carrier 18 is slight to prevent the entrance of dust and a pile fabric can be secured on each end of the carrier 18 to contact the wall 14 if necessary.

The multiple objective carrier 18 is provided with a plurality of transverse dovetailed grooves 20 in which a plurality of objectives 21 are detachably secured. These objectives 21 may take any convenient form.

A second shaft 22 is rotatably mounted within the body member 11 on an axis parallel to the axis of the shaft 17 and an objective mount 23 carrying objectives 24 is fixed to the shaft 22 for rotation therewith. A gear 25 is also fixed on the shaft 22 for engagement with a segmental gear 26 fixed on the shaft 17. The shaft 17 is formed with an enlarged knurled head 27 having a slot or hole 28 in which a pin 29 on the objective carrier arm 19 is adapted to fit. By means of the slot 28 and pin 29, the shaft 17 is fixed to the multiple objective carrier 18 so that rotation of the objective carrier rotates the shaft 17. The segmental gear 26 is so positioned that when the objective carrier 18 is moved to one extreme position, the segmental gear 26 engages the gear 25 and turns the shaft 22 so that the objective lens mount 23 and objectives 24 are moved into the light path as shown in dotted lines in Fig. 1.

The objectives 24 are complete objectives and it is therefore necessary, when the objectives 24 are to be used, that the groove 20, which is in the light path when the objective carrier 18 is in its extreme position, be left open. If, however, the operator wishes to mount another objective 21 in this groove 20, the objective lens mount 23 can be easily moved to its inoperative position. The shaft 17 is axially slidable and a spring 30 urges it in such a direction that the pin 29 and slot 28 will be in engagement. When the objective carrier 18 is in the position shown in Fig. 1 the operator can move the objective lens mount 23 out of the light path by pulling the head 27 and shaft 17 against the spring 30 until the pin 29 is disengaged from the slot 28. The segmental gear 26 is made wide so that it engages the gear 25 in any axial position of the shaft 17 and by merely turning the enlarged knurled head 27 after disengagement of the pin 29, the objective lens mount 23 is moved out of the light path.

From the foregoing it will be apparent that I am able to attain the objects of my invention and provide a variable power binocular microscope having a multiple objective carrier and a pivoted lens mount which may be moved into and out of the light path by movement of the objective carrier.

I claim:

1. In a microscope a hollow body member having a light path therethrough, a multiple objective carrier movably mounted on said member, a lens mount, means for movably mounting said lens mount within said member and means on said carrier cooperating with the first named means for moving said mount into and out of said light path.

2. In a microscope a hollow body member having a light path therethrough, a multiple objective carrier pivotally mounted on said member, a lens mount pivotally mounted within said member and cooperating gear means on said carrier and said mount whereby movement of said carrier moves said mount.

3. In a microscope a hollow body member having a light path therethrough, a multiple objective carrier movably mounted on said member, a lens mount pivotally mounted within said member, a gear fixed for rotation with said mount, and a segmental gear engaging said first gear and fixed for movement with said carrier whereby movement of said carrier will move said mount into and out of said light path.

4. In a microscope a hollow body member having a light path therethrough, a multiple objective carrier pivotally mounted on said member, said carrier having a plurality of openings each adapted to be moved into registry with said light path, a lens mount, means for pivotally mounting said lens mount within said member and cooperating means on said carrier and said mount for moving said mount into the light path when one of said openings is moved into registry with said light path.

5. In a microscope a hollow body member having a light path therethrough, a multiple objective carrier movably mounted on said member, said carrier having a plurality of light openings adapted to be moved selectively into alignment with said light path, a lens mount, means for pivotally mounting said lens mount within said member and interconnecting means between said carrier and said mount whereby said mount will be moved into the light path when one opening in said carrier is moved into alignment with said path.

6. In a microscope a hollow body member having a light path therethrough, a shaft rotatably mounted in said body member, an objective carrier pivotally mounted on said shaft outside of said body member, a lens mount pivotally mounted within the member for movement into and out of said light path, and connecting means between said shaft and said mount whereby the turning of said shaft pivots said mount.

7. In a microscope a hollow body member having a light path therethrough, a shaft rotatably mounted in said body member, an objective carrier pivotally mounted on said shaft outside of said body member, a lens mount pivotally mounted within the member for movement into and out of said light path, connecting means between said shaft and said mount whereby the turning of said shaft pivots said mount, and means for selectively connecting said shaft to said objective carrier.

8. In a microscope a body member having a light path therethrough and having an arcuately curved lower wall, a shaft rotatably and slidably supported in said body member substantially on the axis of said arcuate wall, a multiple objective carrier rotatably mounted on said shaft outside of said body member, means for supporting a plurality of objectives in said carrier, a lens mount pivotally mounted within said member for movement into and out of said light path, drive means between said shaft and said mount whereby the turning of said shaft pivots said mount, interengageable means on said carrier and on said shaft for locking said shaft to said carrier and means for urging said interengageable means into engagement.

RALPH E. WILKINSON.